US006875991B1

(12) United States Patent
Jarvinen et al.

(10) Patent No.: US 6,875,991 B1
(45) **Date of Patent: *Apr. 5, 2005**

(54) MODULATED RESISTANCE HEATER INFRARED RADIATION SOURCE

(76) Inventors: Philip O. Jarvinen, Fairway Dr., Amherst, NH (US) 03031; John R. Kreick, 7 Northwood Dr., Nashua, NH (US) 03060

( * ) Notice: Subject to any disclaimer, the term of this patent is extended or adjusted under 35 U.S.C. 154(b) by 0 days.

This patent is subject to a terminal disclaimer.

(21) Appl. No.: 05/327,339

(22) Filed: Jan. 29, 1973

(51) Int. Cl.[7] ............................ G01J 1/00; G02B 26/00
(52) U.S. Cl. .............................. 250/495.1; 250/504 R; 359/233; 359/235
(58) Field of Search .......................... 250/495.1, 504 R; 359/233–235

(56) References Cited

U.S. PATENT DOCUMENTS 1,860,824 A * 5/1932 Tate
1,863,363 A * 6/1932 Zworykin .................. 350/272
2,237,193 A * 4/1941 Mobsby
2,303,873 A * 12/1942 Anderson .................. 219/354
2,677,748 A * 5/1954 Naylor ..................... 219/354
3,108,171 A * 10/1963 Vary ....................... 219/347
3,445,662 A * 5/1969 Langley .................... 219/354
3,703,635 A * 11/1972 Burkarth .................... 350/1
3,797,395 A * 3/1974 Tyroler

FOREIGN PATENT DOCUMENTS

FR 1143271 * 9/1957 ................ 350/272

OTHER PUBLICATIONS

Dunlap, *Radiant Heating with Silicon Carbide*, IEEE Transactions on Industry & General Applications, Mar./Apr. 1970, 219–354.*

* cited by examiner

*Primary Examiner*—Stephen C. Buczinski

(57) ABSTRACT

An electrically heated resistance element disposed on axis within a gold coated reflector, which collects the radiated infrared energy from the resistance element and shapes it to a desired beam, provides a shaped high intensity source of infrared radiation which is modulated by a rotating modulator positioned in front of the reflector.

12 Claims, 4 Drawing Sheets

MODULATED RESISTANCE HEATER INFRARED RADIATION SOURCE

BACKGROUND OF THE INVENTION

Prior to the present invention the primary sources of infrared radiation have been the cesium arc lamp and combustion heated sources both of which are relatively complex and costly.

SUMMARY OF THE INVENTION

Accordingly, it is an object of this invention to provide a new and novel source of high intensity infrared radiation.

It is another object of this invention to provide a high temperature source of infrared radiation from a silicon carbide resistance heating element in combination with a gold coated reflector.

It is a further object of this invention to provide a shaped beam of infrared energy with a given angular distribution and on-axis intensity.

It is yet another object of this invention to provide a source of infrared energy which is low in cost, requires only a minimum number of parts, is highly efficient, is small in size and requires only a minimum of controls.

Briefly, in one embodiment a modulated high intensity infrared radiation source comprises a resistance type electrical heating element which is spirally cut in the center thereof so as to minimize cross-sectional area and thereby provide higher resistance and, thus, greater amounts of heat. The ends of the heating element are not spirally cut. Thus, these portions operate cooler, facilitating mechanical support thereof and electrical connections thereto. The heating element is disposed within a reflector near the focal point thereof to shape the radiation into a high intensity beam. The reflector is gold plated so as to maximize reflection and yet not tarnish over long life operation.

A quartz window is placed over the front of the reflector to form a sealed cavity to protect the heating element from unwanted or cooling air currents. The heating element is preferably filled with a ceramic material to improve its structural rigidity and vibration characteristics. One or more modulating elements is disposed outside the window to provide modulation of the infrared radiation emitted therethrough. A further window may be arranged outside the modulator to act as a filter such that only desirable radiation will exit the source.

BRIEF DESCRIPTION OF THE DRAWINGS

The above-mentioned and other features and objects of this invention will become more apparent by reference to the following description taken in conjunction with the accompanying drawing, in which.

DESCRIPTION OF PREFERRED EMBODIMENTS

Figure 1:
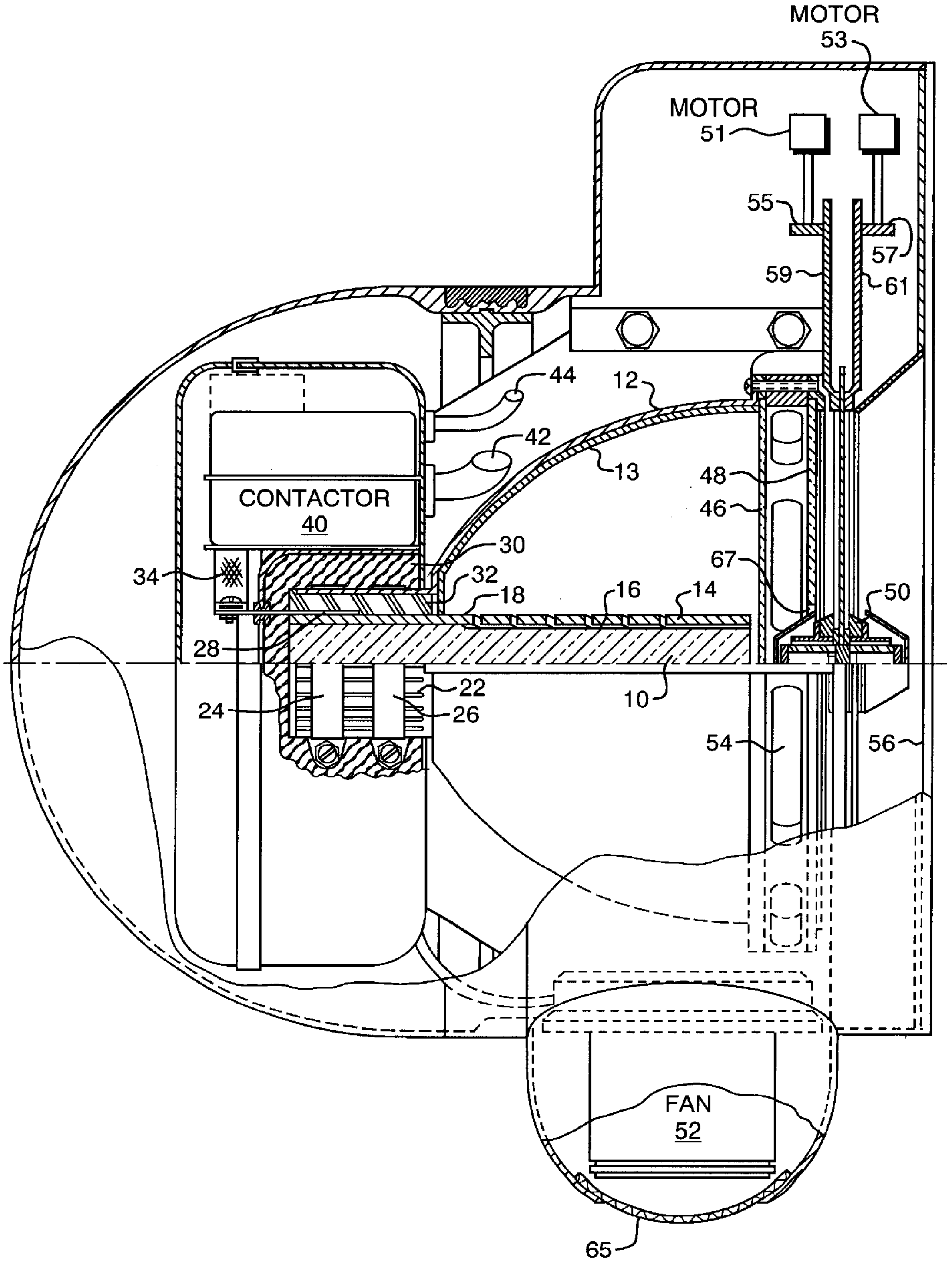
FIG. 1 is a partial cross-sectional view of one embodiment of a resistance heated infrared radiation source of utility in the practice of the present invention.

Referring now to FIG. 1, there is illustrated thereby a preferred embodiment of a resistance type electrical heater infrared radiation source. This source comprises a resistance electrical heating element 10 mounted within a reflector 12.

Reflector 12 may be made of or coated with preferably gold coating 13 to maximize reflectivity while minimizing susceptibility to tarnishing. Other coatings with good reflectivity and which can sustain the high temperatures and high power densities of the source may be employed.

Figure 3:
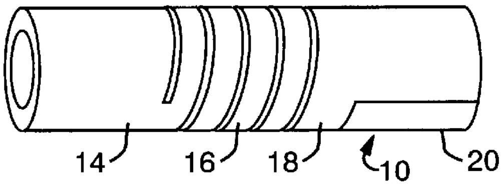
FIGS. 3–8 are sketches of alternative resistance type heaters of utility in the practice of the present invention.

The elctrical heating element 10 is illustrated in greater detail in FIG. 3. It comprises a forward section 14 disposed at the front of the reflector, a middle section 16, which is spirally cut, and a back section comprising parts 18 and 20 to which the electrical connections are made. By spirally cutting the middle section of the heating element the cross-sectional area thereof becomes less, thereby greatly increasing its resistance. Therefore, the ends of the heating element will be relatively cool because of the larger cross-sectional area, while the middle section 16 will be very hot. The reason for providing cool ends on the heating element is to facilitate making mechanical and electrical connections thereto so as not to melt any connecting wires or support members.

The heating element 10 is mounted in the reflector at the neck thereof with the hottest portion arranged about the focal point of the reflector. The neck has a number of slots 22 therein to make it flexible. The neck is fitted over section 18 of the resistance element with a lava block 32 therebetween and these elements are held together by a pair of hose clamps 24 and 26. The reflector directs the power into a particular volume of space. A parabolic reflector would be preferred, however, in the embodiment illustrated in FIG. 1 the heating element is relatively large thereby part of it is removed from the focal point of the reflector. So in order not to lose much of the radiation out of the relatively narrow beam through spill over, a substantially semi-hemispherical reflector is used. If a larger reflector is desired than that shown, it would be parabolic in shape.

In the preferred embodiment heating element 10 is made of silicon carbide and filled with Allundum, an aluminum oxide material manufactured by the Norton Company. The filling of the rod provides additional structural integrity.

Silicon carbide is the preferred material since operation is permitted at high temperatures (on the order of 1975° K), it can be electrically heated and has a high emissivity. For lower temperature applications, wire resistor elements mounted on a ceramic base can be used. Alternatively, a layer of silicon carbide can be applied to a ceramic base having better mechanical properties than the silicon carbide itself. Other means can also be employed to give additional structural integrity to the heating element.

An electrode 28 is connected to the section 18 heating element to supply current thereto. Another similar electrode (not shown) is connected to section 20. This portion of the unit is encased in an insulating material 30, for example, Fiberfax.

The electrodes 28 are connected by electrical straps 34 to a contactor 40. The contactor is controlled by a signal applied to the coil thereof from a cable 44.

The front of the reflector 12 is closed by a pair of spaced windows 46 and 48. Windows 46 and 48 are preferably quartz, however, silicon and other more expensive materials may be employed. A modulator 50 is arranged outside the windows comprising a pair of rotating discs. Motors 51 and 53 through friction wheels 55 and 57 rotate the modulator discs through modulator coupling members 59 and 61. The modulator disc could also be run by gearing arrangements or any other mechanism to cause rotation of a pair of discs.

Cooling air is supplied from a fan 52 through slots 54 between the windows through holes 67 in window 48 to cool modulator 50. The same power source which supplies current to heating element 10 also supplies power to run fan 52. A screen 65 keeps the cooling air free of contaminants. A filter may also be provided if small particles, such as dust, are a problem.

In certain applications where large air currents are not a problem or where cooling of the modulators is not necessary, the windows may be omitted. However, for safety reasons some window should be used to protect users from the electrically hot rod as well as protect against dust and dirt.

Figure 2:
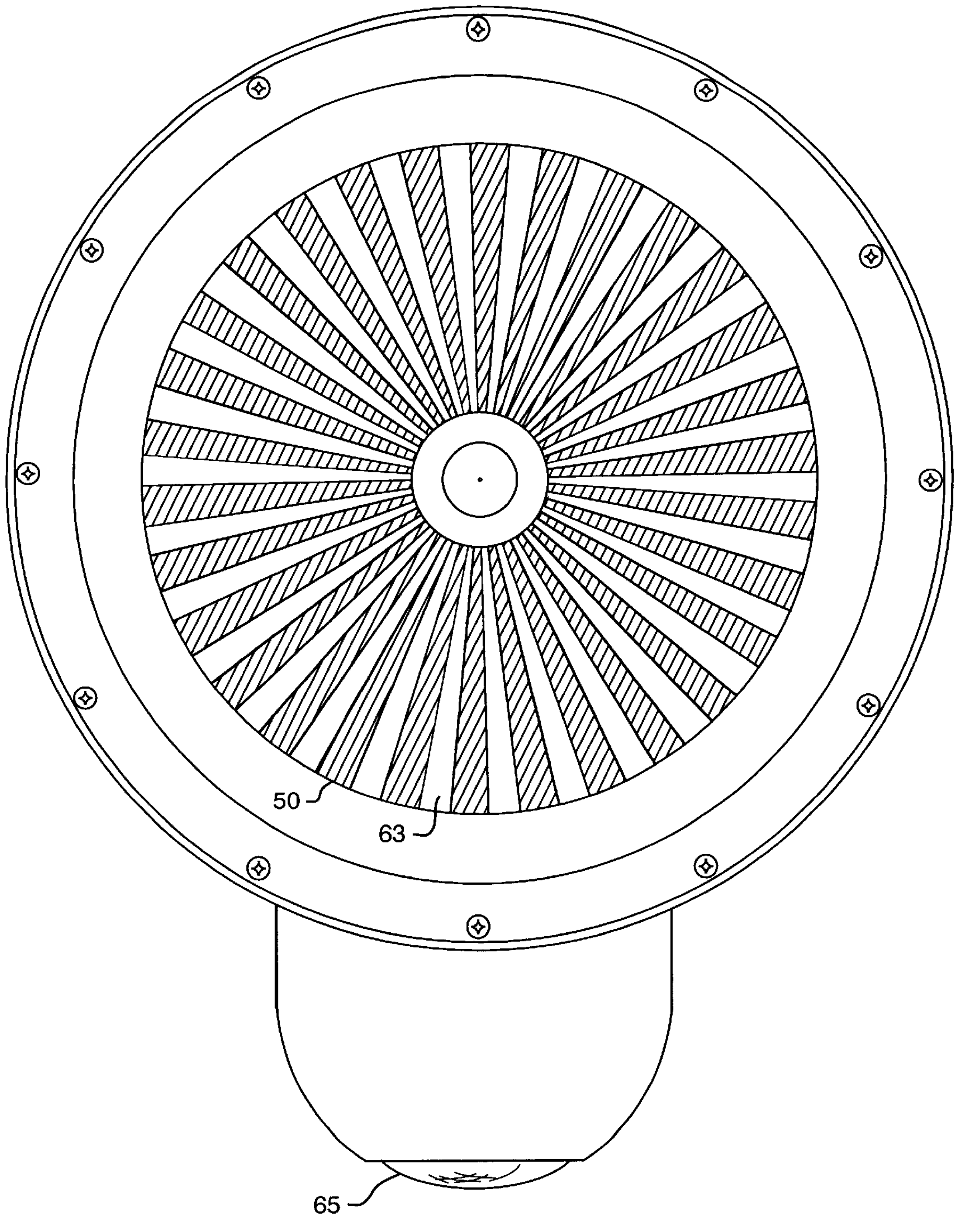
FIG. 2 is a back view of the source of FIG. 1 particularly illustrating a modulator for use therewith.

In FIG. 2 one section 63 modulator 50 is shown. Section 63 comprises alternating opaque and transparent sections at the wavelengths of interest. If desired, a solid wheel with cutouts may be employed. To provide modulation of the output of the source at least two sections are required, one stationary and one rotating. However, both sections may rotate in opposite directions. In certain applications it is desirable to modulate a carrier and thus three sections 63 would be used, two rotating at different frequencies with a nonrotating section therebetween. A further window 56 may encase the front of the unit and this window may be made of a material to filter out other than the desired infrared radiation.

In the embodiment illustrated 95% of the electrical power is converted to radiant energy, 22–25% in the 1.7 micron to 2.7 micron band, approximately 12% in the 2.8 to 3.2 micron band, and somewhat less in the 3 micron to 5 micron band.

Figure 4:
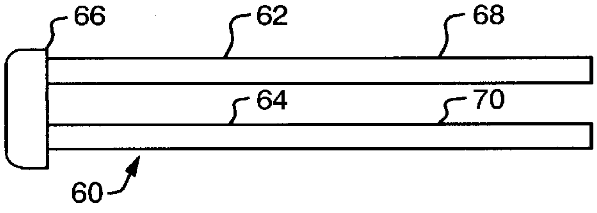

Additional embodiments of the heating element are illustrated in FIGS. 4 through 8B. In FIG. 4 a single u-shaped silicon carbide heating element 60 is illustrated comprising a pair of silicon carbide rods 62 and 64, with a connecting cap 66. The ends 68, 70 at which electrical connections are made to the rods, preferably, are doped with pure silicon metal to reduce the resistance thereof so it will operate cooler thereby facilitating electrical and mechanical connections thereto. Connecting cap 66 can be made to operate either hot or cold depending upon whether or not mechanical connections are to be made thereto.

Figure 5:
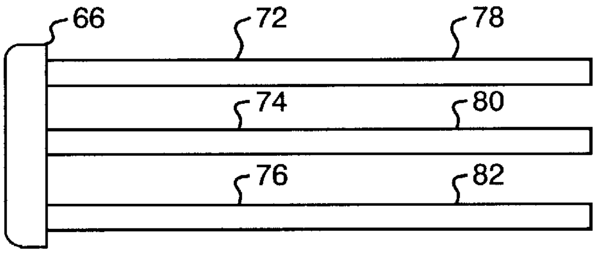

In FIG. 5 three rods 72, 74 and 76 are used. These also have cold ends 78, 80 and 82. The three rods are desirable for units with three phase input power.

Figure 6A:
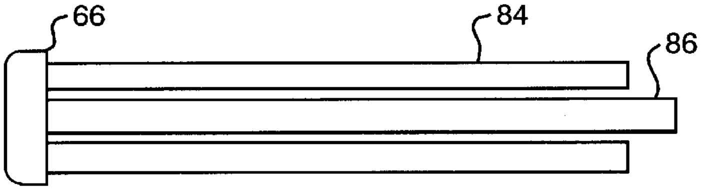
Figure 6B:
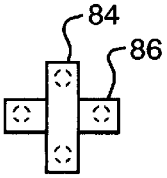

In FIGS. 6A and 6B another arrangement is illustrated wherein two heaters 84 and 86 are employed at right angles to each other. Each resistance element is like that shown in FIG. 4. In this embodiment it is desirable to generate a more symmetrical pattern approaching circular. Furthermore, the double unit has greater surface area and thus more radiation emitted therefrom.

Figure 7:
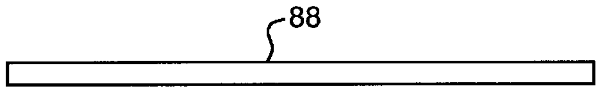

FIG. 7 illustrates a single silicon carbide rod 88 which could replace heating element 10. The rod is doped with silicon metal where mechanical or electrical connections are to be made so that, as mentioned before, the rod will run cooler. Also, the rod may be metalized with aluminum where electrical connections are to be made.

Figure 8A:
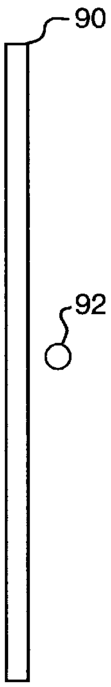
Figure 8B:
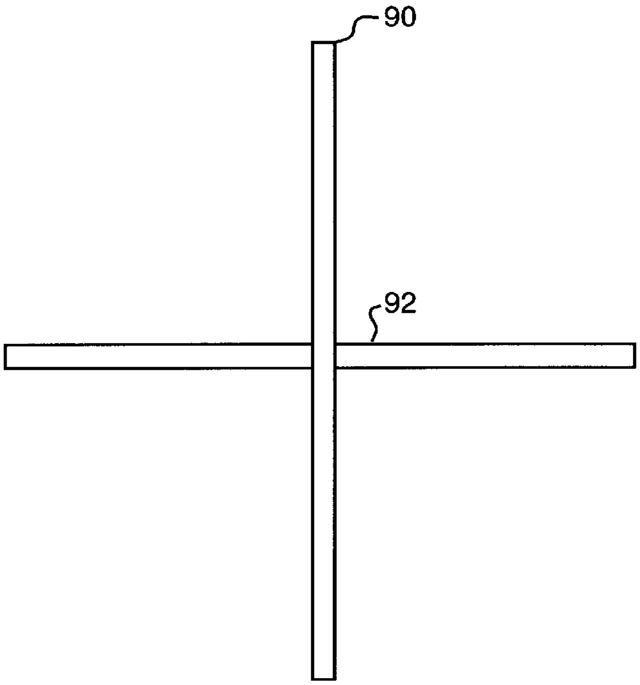

In FIGS. 8A and 8B two rods 90, 92 are arranged at right angles to provide a desirable spatial coverage. Again, these rods may be doped with silicon metal to provide cooler ends and metalized to provide better electrical connections.

In all the above embodiments the heating elements are located as close to the focal point of the reflector as possible.

In addition, to provide various rod configurations, the radiated beam may be changed by providing different shaped reflectors or by varying the positions of the rods in the reflectors. Thus, it is to be understood that the embodiments shown are illustrative only and that many variations and modifications may be made without departing from the principles of the invention herein disclosed and defined by the appended claims.

We claim:

1. A modulated source of radiant infrared energy, comprising:

an element formed of a material which when current is applied thereto emits radiant infrared energy;

a reflector having an open end surrounding said element for collecting the radiant infrared energy and shaping it to a beam;

means for applying current to said element; and means for continually modulating the output from said reflector so as to provide radiant infrared energy whose amplitude varies in accordance with a predetermined pattern;

said modulating means being substantially the same size as the open end of said reflector such that said beam of radiant infrared energy is intercepted by substantially the entire modulating means, said modulating means further being arranged such that at one position thereof substantially one-half of all of the energy in said beam is transmitted therethrough.

2. Apparatus as recited in claim 1, further including means substantially transparent to said radiant energy closing said open end of said reflector.

3. Apparatus as recited in claim 1 wherein said element is formed of silicon carbide.

4. Apparatus as recited in claim 1 wherein portions of said element where mechanical or electrical connections are to be made thereto are of greater cross-sectional area than the remaining portions thereof, thus running said greater cross-sectional areas at a cooler temperature.

5. Apparatus as recited in claim 3 wherein portions of said element where mechanical or electrical connections are to be made thereto are doped with silicon metal to reduce the resistance of those portions and thus the temperature thereof.

6. Apparatus as recited in claim 1 wherein said reflector has a gold coating on the internal surface thereof.

7. Apparatus as recited in claim 1 wherein said portions of said element are spirally cut to decrease cross-sectional area thereof and thus increase temperature for a predetermined current.

8. Apparatus as recited in claim 1 wherein said element is formed of a plurality of rods arranged to provide a predetermined radiation pattern.

9. Apparatus as recited in claim 1 wherein said modulating means includes first and second modulating elements each having a plurality of alternating opaque and transparent radial segments, and means for providing relative rotation between said first and second elements.

10. A modulated source of radiant infrared energy, comprising:

an element formed of a material which when current is applied thereto emits radiant infrared energy;

a reflector having an open end surrounding said element for collecting the radiant infrared energy and shaping it to a beam;

means for applying current to said element;

means for continually modulating the output from said reflector so as to provide radiant infrared energy whose amplitude varies in accordance with a predetermined pattern; and means substantially transparent to said radiant energy closing said open end of said reflector including first and second spaced apart windows, said second window having at least one hole therein with said first window disposed closer to said reflector than said second window.

11. Apparatus as recited in claim 10, further comprising means for cooling said modulator, including means for introducing cooling air into the space between said first and second windows and through the hole in said second window onto said modulating means.

12. A modulated source of radiant infrared energy, comprising:

a silicon carbide element which when current is applied thereto emits radiant infrared energy, said element being hollow and filled with an insulating material to provide added structural integrity;

a reflector having an open end surrounding said element for collecting the radiant infrared energy and shaping it to a beam;

means for applying current to said element; and means for continually modulating the output from said reflector so as to provide radiant infrared energy whose amplitude varies in accordance with a predetermined pattern.

* * * * *